United States Patent [19]

Hoffman

[11] 4,394,491

[45] Jul. 19, 1983

[54] ADDITION POLYMERIZABLE ADDUCT OF A POLYMERIC MONOAHL AND AN UNSATURATED ISOCYANATE

[75] Inventor: Dwight K. Hoffman, Midland, Mich.

[73] Assignee: The Dow Chemical Company, Midland, Mich.

[21] Appl. No.: 195,155

[22] Filed: Oct. 8, 1980

[51] Int. Cl.³ .................. C08L 71/02; C08L 75/08
[52] U.S. Cl. .................. 525/452; 525/404; 525/411; 525/412; 525/440; 525/455; 525/920; 560/160
[58] Field of Search .............. 525/404, 411, 412, 440, 525/455, 452; 560/160

[56] References Cited

U.S. PATENT DOCUMENTS

| | | | |
|---|---|---|---|
| 2,718,516 | 9/1955 | Bortnick | 260/17.4 SG |
| 2,882,259 | 4/1959 | Graham | 260/45.5 |
| 3,453,223 | 7/1969 | Suling | 525/59 |
| 3,641,199 | 2/1972 | Niederhauser | 525/440 |
| 3,924,023 | 12/1975 | Boranian | 427/54 |
| 3,928,299 | 12/1975 | Rosenkranz | 260/89.5 N |
| 4,008,247 | 2/1977 | Tucker | 260/308 B |
| 4,233,245 | 11/1980 | Tefertiller | 525/455 |
| 4,239,866 | 12/1980 | Reitel | 525/920 |

FOREIGN PATENT DOCUMENTS 1187195 4/1970 United Kingdom .
1384343 2/1975 United Kingdom .

*Primary Examiner*—Paul Lieberman

[57] ABSTRACT

An adduct of a monoahl, e.g., a monohydroxyl polyalkylene oxide, and an active ethylenically unsaturated isocyanate, e.g., 2-isocyanatoethyl methacrylate, is usefully employed in the preparation of stable copolymer dispersions of the type used in the production of polyurethane foams and polyurethane elastomers.

The copolymer dispersion is prepared by addition copolymerization of (1) the adduct with (2) ethylenically unsaturated monomer(s), e.g., styrene or mixture thereof with acrylonitrile, while (1) and (2) are dispersed or dissolved in an excess of an active hydrogen polyfunctional compound.

9 Claims, No Drawings

ADDITION POLYMERIZABLE ADDUCT OF A POLYMERIC MONOAHL AND AN UNSATURATED ISOCYANATE

BACKGROUND OF THE INVENTION

This invention relates to addition polymerizable adducts of active hydrogen compounds and isocyanates and to copolymer dispersions and polyurethane products prepared from such adducts.

Polyurethanes constitute a broad class of polymeric materials having a wide range of physical characteristics. The polymers are produced by the reaction of a polyisocyanate with a polyfunctional compound having an active hydrogen in its structure. This active hydrogen compound is generally a liquid or solid capable of being melted at relatively low temperatures. Most commonly, the active hydrogen compound contains hydroxyl groups as the moieties having the active hydrogen and thus are termed polyols, e.g., the polyols of polyesters, polyester amides, or polyethers, or mixtures of two or more such materials. For reasons of commercial availability and cost, the polyols most commonly employed in the preparation of polyurethanes are the polyethers having hydroxyl terminated chains and hydroxyl terminated polyesters.

Although a wide variety of physical and chemical properties are obtainable by the proper selection of a polyisocyanate and the polyol as well as the conditions under which the polyurethane reaction is carried out, the resulting polyurethane often exhibits properties, e.g., load bearing and processability, which are unacceptable for some applications, particularly for foam applications as well as for elastomer and plastic applications.

To improve such properties, it has been the practice of the art to employ graft copolymer dispersions (often called polymer polyols) prepared from vinyl monomers and polyols in the preparation of polyurethanes as shown in U.S. Pat. Nos. 3,383,351; 3,304,273; 3,523,093; 3,652,639 and 3,823,201. In U.S. Pat. No. 3,304,273, a mixture of styrene and a polar monomer are copolymerized while dispersed in a polyol which is essentially free of ethylenic unsaturation. Unfortunately, stable dispersions cannot be prepared by this technique if high proportions of styrene monomer are employed. Subsequently, in order to overcome this problem, it was found desirable to employ polyols which contain a significant amount of ethylenic unsaturation. As shown in U.S. Pat. No. 3,823,201, such unsaturation was advantageously introduced by reacting the polyol with an organic compound having both ethylenic unsaturation and hydroxyl, carboxyl or epoxy moieties which are reactive with the active hydrogen moiety of the polyol. While these more improved graft copolymer dispersions solve many of the problems confronting the polyurethane art, most require the use of high molecular weight polyols as the continuous phase in order to provide a stable dispersion.

Accordingly, it is highly desirable to provide an improved copolymer dispersion wherein less unsaturated moiety is required in order to achieve a stable dispersion of the polymer in polyols.

SUMMARY OF THE INVENTION

In one aspect, the present invention is an ethylenic addition polymerizable adduct of a monoahl and an active ethylenically unsaturated isocyanate. By "monoahl" is meant an organic compound containing only one active hydrogen moiety capable of reacting with the isocyanate moiety of the unsaturated isocyanate via a urethane type reaction to form the adduct.

In addition to their usefulness in the preparation of polymer dispersions, the adduct of the polymeric monoahl and the isocyanate monomer is also useful in the preparation of stabilizers for other nonaqueous dispersions, particularly nonaqueous coating systems and organic dispersions of barrier resins, as well as in the preparation of stabilizers, thixotropic agents and thickeners for aqueous dispersions such as latexes used in latex paints, etc. This adduct is also useful in the preparation of lubricants, encapsulants, polishes, adhesives, and polymer powders.

In another aspect, the present invention is a polymer dispersion having improved stability and more uniform particle size distribution which comprises:

(A) a polyahl having dispersed therein; and (B) an addition copolymerizate of (1) the adduct of the monoahl and the active ethylenically unsaturated isocyanate (hereinafter called "isocyanate monomer") and (2) at least one ethylenically unsaturated monomer other than an isocyanate monomer (hereinafter called "other monomer"); or (C) a mixture of (1) an adduct of (i) the monoahl of claim 1 and (ii) an addition copolymer of the isocyanate monomer with at least one "other monomer" which is nonreactive with the isocyanate and the monoahl and (2) an ethylenic addition polymer of at least one "other monomer"; or (D) a combination of (B) and (C); or (E) a combination of (B) and/or (C) and a polymer of at least one "other monomer", said monoahl and isocyanate monomer being present in reacted form in an amount sufficient to stabilize the dispersion.

For the purposes of this invention, a "polyahl" is a polyfunctional compound wherein at least two of the functional groups are active hydrogen moieties capable of reacting with an isocyanate moiety to form a urethane or similar moiety. In addition, the terms "dispersed" or "dispersion" as used herein are generic to include dispersions wherein the disperse phase constitutes colloidal size particles as well as true solutions wherein the disperse phase is at the molecular or ionic level. A stabilized or stable dispersion is a dispersion in which the dispersed particles do not coalesce upon standing.

Surprisingly, the copolymer dispersions of the present invention exhibit excellent stability even at relatively low concentrations of ethylenically unsaturated moieties existing in the adduct of the monoahl and isocyanate monomer. Even more surprising is the fact that such stable dispersions can contain a low molecular weight polyahl or a mixture of polyahls as the continuous phase.

This invention, in yet another aspect, is a method for making the aforementioned copolymer dispersion. In yet a further aspect, this invention is a polyurethane composition, preferably in the form of a foam, prepared from the copolymer dispersion as well as a method for reacting the copolymer dispersion with polyisocyanate to form polyurethane foams and other polyurethane compositions.

The copolymer dispersions of the present invention are usefully employed in the production of a wide variety of polyurethane products including cellular polyurethanes, polyurethane films and coatings as well as cast or molded articles of such polyurethanes. As used herein, the term "polyurethane" is to be broadly construed to include the polymeric reaction products of isocyanates with polyahls as hereinbefore defined.

DETAILED DESCRIPTION OF REPRESENTATIVE EMBODIMENTS

The polyahl suitably employed as the continuous phase of the copolymer dispersion includes any organic compound having at least two active hydrogen moieties wherein the compound has a number average molecular weight ($M_n$) of at least 62. Preferably the polyahl is a polymer having at least two active hydrogen moieties, an $M_n$ of at least 200 and at least three repeating units of a monomeric moiety. For the purposes of this invention, an active hydrogen moiety refers to a moiety containing a hydrogen atom which, because of its position in the molecule, displays significant activity according to the Zerewitnoff test described by Woller in the *Journal of American Chemical Society*, Vol. 49, page 3181 (1927). Illustrative of such active hydrogen moieties are —COOH, —OH, —NH$_2$, =NH, —CONH$_2$, —SH and —CONH—. Typical polyahls include polyols, polyamines, polyamides, polymercaptans, polyacids and the like, particularly as exemplified in U.S. Pat. No. 3,928,299.

Of the foregoing polyahls, the polyols are preferred. Examples of such polyols are the polyol polyethers, the polyol polyesters, hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, aliphatic and aromatic polyols and thiols including polythiols, ammonia and amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxyl group. Also alkylene adducts of compounds which contain one —SH group and one —OH group as well as those which contain an amino group and a —SH group may be used.

Polyether polyols which are most advantageously employed as the polyahl in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, α-methyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxyphenyl)propane, commonly known as bisphenol A. Illustrative oxiranes that are advantageously employed in the preparation of the polyether polyol include simple alkylene oxides such as ethylene oxide, propylene oxide, butylene oxide, and amylene oxide; glycidyl ethers such as t-butyl glycidyl ether and phenyl glycidyl ether; and random or block copolymers of two or more of these oxiranes. The polyalkylene polyether polyols may be prepared from other starting materials such as tetrahydrofuran and alkylene oxide tetrahydrofuran copolymers; epihalohydrins such as epichlorohydrin; as well as aralkylene oxides such as styrene oxide. The polyalkylene polyether polyols may have primary, secondary or tertiary hydroxyl groups and, preferably, are polyethers prepared from alkylene oxides having from two to six carbon atoms such as ethylene oxide, propylene oxide and butylene oxide.

The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951), or in U.S. Pat. No. 1,922,459. Also suitable are polyether polyols and processes for preparing them that are described in Schick, M. J., *Nonionic Surfactants*, Marcel Dekker, Inc., New York (1967), U.S. Pat. Nos. 2,891,073; 3,058,921; 2,871,219 and British Pat. No. 898,306. Polyether polyols which are most preferred include the alkylene oxide addition products of water, trimethylolpropane, glycerine, pentaerythritol, sucrose, sorbitol, propylene glycol and blends thereof having hydroxyl equivalent weights of from about 250 to about 5000.

Polyhydric thioethers which are sometimes advantageously condensed with alkylene oxides include the reaction product of thiodiglycol with alkylene oxides or dihydric alcohols such as disclosed above.

Polyhydroxyl-containing phosphorus compounds which are optionally used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Polyacetals (acetal resins) which are optionally reacted with alkylene oxides or other oxiranes include the reaction product of formaldehyde or other suitable aldehyde with a polyhydric alcohol or an oxirane such as those disclosed above. Polyacetals derived from acetone or from cyclic acetals are also suitably employed.

Aliphatic and aromatic thiols which are optionally reacted with alkylene oxides and other oxiranes include alkane thiols such as 1,2-ethane dithiol, 1,2-propane dithiol and 1,6-hexane dithiol; alkene thiols such as 2-butene-1,4-dithiol; and alkyne thiols such as 3-hexyne-1,6-dithiol; and arene thiols such as 1,4-benzene dithiol. Other thiols suitable for this purpose are hydrogen sulfide as well as thiol functional polymers such as polyvinylbenzyl thiol.

Acids and amides which are optionally reacted with alkylene oxides and other oxiranes include difunctional fatty acids such as hydroxystearic and dihydroxystearic acid as well as amides such as fatty acid alkanol amides, e.g., lauroyl monoethanolamide; diacids such as adipic and terephthalic acid; sulfonamides and other acids and amides set forth in Schick, supra.

Amines which are optionally reacted with alkylene oxides and other oxiranes include aromatic amines such as aniline, o-chloroaniline, p-amino aniline, 1,5-diamino naphthalene, methylene dianiline, the condensation products of aniline and formaldehyde and 2,4-diamino toluene; aliphatic amines such as methylamine, triisopropanolamine, isopropanolamine, diisopropanolamine, ethylenediamine, 1,3-propylenediamine, 1,4-butylenediamine and 1,3-butylenediamine, mixtures thereof and the like.

Additional polyethers and methods for their preparation are set forth in Schick, supra.

Examples of suitable hydroxy-containing polyesters include those obtained from polycarboxylic acids and polyhydric alcohols. Examples of suitable polycarboxylic acids include oxalic acid, malonic acid, succinic acid, glutaric acid, adipic acid, pimelic acid, suberic acid, azelaic acid, sebacic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1,-trimethylolpropane, 1,1,1-trimethylolethane, hexane-1,2,6-triol, α-methyl glucoside, pentaerythritol and sorbitol. Also included within the term "polyhydric alcohol" are compounds derived from phenols such as 2,2-(4,4'-hydroxyphenyl)propane, commonly known as bisphenol A, bis(4,4'-hydroxyphenyl)sulfide and bis-(4,4'-hydroxyphenyl)sulfone.

Other polyahls suitably employed include polylactones; hydroxy functional acrylic polymers such as polymers of hydroxyethyl acrylate, hydroxyethyl methacrylate, hydroxypropyl acrylate and hydroxypropyl methacrylate; polyvinyl acetate and other polymers of vinyl acetate and other ethylenically unsaturated carboxylic acids; hydroxyl-containing epoxy resins; urea-formaldehyde and melamine-formaldehyde resins; hydroxyl-containing polycarbonates and polyurethanes; methylol resins; starches and other cellulosic polymers; esters of phosphoric, sulfonic, sulfuric and boric acid; and polypeptides; polyamines such as polyethyleneimines, polypropyleneimines and condensate polymers of aniline and formaldehyde; acrylamide polymers; amine-functional polyglycols; mercaptan-functional polyglycols and polyalkylene sulfides; carboxy-functional polymers such as polyacrylic acid and the like.

In the adducts of the copolymer dispersion, the monoahl includes any organic compound which has one active hydrogen moiety per molecule and stabilizes a dispersion of a polymer including the adduct in a continuous liquid phase. Most preferably, the monoahl is dispersible in the continuous phase of the dispersion, e.g., the polyahl. An active hydrogen moiety can contain one or two active hydrogens and is an active hydrogen moiety as defined hereinbefore for the polyahl. For the purposes of this invention, a monoahl is considered dispersible in the continuous phase of the dispersion if at least 0.01 mole of the monoahl disperses in a mole of the polyahl of the continuous phase to form a thermodynamically stable solution.

Examples of such monoahls include monohydric polyethers and monohydric polyesters which are similar in all respects to such polyols as defined hereinbefore except that monofunctional initiators such as monohydric alcohols are used as polymerization initiators instead of the polyfunctional initiators used to initiate polyol polyethers and polyol polyesters. Exemplary monohydric initiators include methanol, ethanol, butanol, and monohydric glycol ethers such as tripropylene glycol methyl ether, as well as phenols, acids, mercaptans, and the like. Other suitable monoahls include monohydroxyl epoxy resins, monohydroxyl polyurethane polymers, monohydroxyl phosphorus compounds, alkylene oxide adducts of monohydric thioethers including polythioethers, monohydric acetals including polyacetals, as well as monomercaptans, N-methylol amides, monoamines, and other compounds which are similar to the aforementioned polyahls except that they contain only one active hydrogen moiety. Of the foregoing monoahls, the monohydric polyethers are preferred.

For the purposes of this invention, the term "active ethylenically unsaturated isocyanate" or "isocyanate monomer" means a monomer having an isocyanate group and an ethylenically unsaturated group capable of undergoing free radical initiated addition polymerization as readily as an α,β-ethylenically unsaturated isocyanate, preferably as readily as acryloyl. Representative isocyanates are the isocyanatoalkyl esters of α,β-ethylenically unsaturated carboxylic acids, α,β-ethylenically unsaturated isocyanates, monovinylidene aryl isocyanates and monovinylidene arylmethyl isocyanates, with the isocyanatoalkyl esters being preferred.

Exemplary isocyanatoalkyl esters include 2-isocyanatoethyl methacrylate, 2-isocyanoethyl acrylate, 3-isocyanatopropyl methacrylate, 1-methyl-2-isocyanatoethyl methacrylate and 1,1-dimethyl-2-isocyanatoethyl acrylate with 2-isocyanatoethyl methacrylate being most preferred. Suitable methods of preparing said isocyanato esters are well known, e.g., as shown in U.S. Pat. Nos. 2,718,516 and 2,821,544 and British Pat. No. 1,252,099. Exemplary monovinylidene aromatic isocyanates and monovinylidene arylmethyl isocyanates include styrene isocyanate and vinylbenzyl isocyanate. Exemplary α,β-ethylenically unsaturated isocyanates include vinyl isocyanate and isopropenyl isocyanate.

The adduct of monoahl and isocyanate monomer is the reaction product resulting from the reaction of an active hydrogen moiety of a monoahl with the isocyanate moiety of an active ethylenically unsaturated isocyanate. The adduct is advantageously miscible in the polyahl which is the continuous phase of the copolymer dispersion. Typically, the adduct has a polymer backbone corresponding to the polymer backbone of the monoahl and at least one pendant ethylenically unsaturated urethane group. When the monoahl is a monol, the linkage is a urethane linkage represented by the formula:

When the monoahl is monoamine, the linkage is a urea linkage represented by the formula:

wherein R is hydrogen or alkyl. The more preferred adducts employed in the present invention are those represented by the formula:

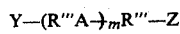

wherein each A is individually —O—, —S— or

wherein $R_1$ is hydrogen or alkyl, most preferably A is —O—; Y is oxyhydrocarbyl including oxyalkyl or oxyaryl, oxycarbonylhydrocarbyl, or a residue of an active hydrogen moiety suitably employed as an initiator in preparation of a polyahl; Z is an oxycarbonylamino aliphatic hydrocarbyl ester of an $\alpha,\beta$-ethylenically unsaturated carboxylic acid; each $R'''$ is individually alkylene, arylene, hydroxyalkylene, aminoalkylene, alkoxyalkylene, aryloxyalkylene, arylalkylene, hydroxyalkylalkylene, hydroxyarylalkylene, or haloalkylene; and m is a whole number such that $+R'''A)_m-R'''-$ has a number average molecular weight ($M_n$) from about 60 to about 100,000, more preferably from about 200 to about 10,000, most preferably from about 500 to about 4,000. For the purposes of this invention, hydrocarbyl is a monovalent hydrocarbon moiety such as aryl, alkyl, alkenyl and the like. Also, the terminology "each $R'''$ is individually" means that the $R'''$ groups in a particular polymer molecule may be the same or different. A corresponding interpretation applies to the terminology "each A is individually."

The most preferred adducts have polyalkyleneoxy backbones bearing one pendant ethylenically unsaturated urethane group represented by the formula:

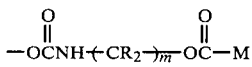

wherein each R is individually hydrogen, alkyl or a comparable inert substituent; M is an ethylenically unsaturated moiety such as

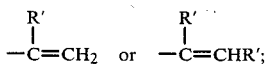

each $R'$ is individually hydrogen or lower alkyl ($C_1-C_4$).

The adduct (hereinafter called "mono-adduct") of isocyanate monomer and monoahl is most advantageously prepared by reacting an active ethylenically unsaturated isocyanate with a monoahl under conditions sufficient to cause the isocyanato group of the isocyanate monomer to react with an active hydrogen group of the monoahl to form a urethane-type linkage. Advantageously, when the monoahl is a monol, the reaction is carried out in the presence of a urethane catalyst such as amine or an organometallic catalyst, preferably an organometallic catalyst such as stannous octoate, lead octoate, stannous acetate, dibutyltin dilaurate and tin and zinc thiolates. The conditions employed in carrying out the urethane reaction involve maintaining the reaction mixture of the monoahl and isocyanate monomer, preferably neat, or alternatively dissolved in a nonreactive solvent such as ethyl acetate, toluene or cellosolve acetate at a temperature from ambient to 140° C. in a vessel for a reaction time from a few seconds to about 24 hours. Also suitably employed are reactive solvents such as monoahl or other ethylenically unsaturated monomers. The equivalent ratio of active hydrogen moiety to isocyanate monomer of the monoahl is sufficient to enable the adduct to stabilize the copolymer dispersion but less than that which will deleteriously affect the physical properties of product made from the copolymer dispersions. In the preferred embodiments, the NCO:active hydrogen equivalent ratios are from about 1.1:1 to about 1:1.5, more preferably from 1.1:1 to 1:1.4, most preferably from 1:1.1 to 1:1.2. The resulting mono-adduct having a pendant ethylenically unsaturated urethane group is generally used without further purification. If a solvent has been used in the reacton, it can be removed, or the composition containing the solvent can be employed as is.

The adduct (hereinafter called "poly-adduct") of (i) the addition copolymer of isocyanate monomer with at least one other ethylenically unsaturated monomer and (ii) a monoahl is beneficially prepared by first copolymerizing the isocyanate monomer with other monomer(s) by polymerization techniques described hereinafter and then reacting the copolymer with monoahl using the procedures and conditions described hereinbefore to react the isocyanate monomer with the monoahl.

The resulting mono-adduct and/or poly-adduct are readily employed in preparing the copolymer dispersion by (1) mixing the adduct(s), polyahl and other ethylenically unsaturated monomer(s) and (2) subjecting the mixture to conditions of conventional addition copolymerization as exemplified hereinafter.

Suitable ethylenically unsaturated monomers (so-called "other monomers" or "other ethylenically unsaturated monomers") which are copolymerized in the presence of the aforementioned adducts include aliphatic conjugated dienes such as butadiene and isoprene; monovinylidene aromatic monomers such as styrene, $\alpha$-methyl styrene, ar-methyl styrene, ar-(t-butyl)styrene, ar-chlorostyrene, ar-cyanostyrene and ar-bromostyrene; $\alpha,\beta$-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; $\alpha,\beta$-ethylenically unsaturated nitriles and amides such as acrylonitrile, methacrylonitrile, acrylamide, methacrylamide, N,N-dimethyl acrylamide, N-(dimethylaminomethyl) acrylamide, and the like; vinyl esters such as vinyl acetate; vinyl ethers; vinyl ketones; vinyl and vinylidene halides as well as a wide variety of other ethylenically unsaturated materials which are copolymerizable with the aforementioned mono-adduct, many of which have heretofore been employed in the formation of copolymer polyols as described in U.S. Pat. Nos. 3,823,201 and 3,383,351. It is understood that mixtures of two or more of the aforementioned "other monomers" are also suitably employed in making the copolymer. Of the foregoing "other monomers," the monovinylidene aromatic monomers, particularly styrene, and the ethylenically unsaturated nitriles, particularly acrylonitrile, are especially preferred.

In the preparation of the dispersion, the adduct(s) is employed in an amount sufficient to stabilize the dispersion of resulting polymer of "other monomer(s)" in the polyahl. Preferably, the amount of adduct(s) is from about 0.0002 to about 30, most preferably from about 0.02 to about 5 weight percent, based on the weight of the dispersion. The amounts of polyahl and "other monomer(s)" employed are not particularly critical, and are usually about the same as in conventional compolymer dispersions. Generally, sufficient polyahl is used to constitute the continuous phase of the dispersion, preferably from about 50 to about 95, most preferably from about 60 to about 90, weight percent based on the dispersion. Preferably, the amount of "other monomer(s)" is from about 5 to about 50, most preferably from about 10 to about 30, weight percent based on the dispersion. The particular method of mixing the adduct(s), other monomer(s) and polyahl is not particularly critical. For example, a uniform mixture is easily achieved by conventional mixing means such as a simple mechanical stirrer.

The copolymerization is readily carried out by simultaneously adding at a steady or constant rate a monomer(s) and a free radical catalyst to a mixture of the mono-adduct and/or poly-adduct and the polyahl under conditons suffucient to cause free radical addition polymerization. The temperature of the copolymerization is dependent upon the initiator and is preferably in the range from about 25° to about 190° C., most preferably from about 110° to about 130° C., when azo-type catalysts are used. Alternatively, the free radical catalyst may be dispersed in a portion of the polyahl and thereafter added along with monomer to the remaining portion of the polyahl containing the mono-adduct. Other polymerization processes, both continuous and batch, may be suitably employed.

Suitably, the concentration of polymerization catalyst is any amount sufficient to cause copolymerization of the mono-adduct and the "other ethylenically unsaturated monomer(s)." Preferably, however, the concentration of catalyst is in the range from about 0.1 to about 20, more preferably from about 0.5 to about 5, weight percent based on the combined weight of the mono-adduct and "other monomer(s)."

Catalysts suitably employed in the practice of the copolymerization are free radical type polymerization catalysts such as the peroxides, persulfates, perborates, percarbonates, azo compounds and the like. Examples of such catalysts include hydrogen peroxide, di(t-butyl)-peroxide, t-butyl peroctoate, lauroyl peroxide, cumene hydroperoxide, t-butyl hydroperoxide, azobis-(isobutyronitrile) as well as mixtures of such catalysts. Of the foregoing catalysts, azobis(isobutyronitrile) is preferred.

In addition to the foregoing catalysts, chain transfer agents such as mercaptans, e.g., dodecanethiol, and carbon tetrahalides such as carbon tetrachloride may be employed in conventional amounts to control molecular weight of the copolymerizate.

In preparing a copolymer dispersion containing a combination (aforementioned combination (D)) of the aforementioned poly-adduct (C) and aforementioned copolymerizate (B) of mono-adduct and "other monomer(s)," a dispersion containing the poly-adduct and a dispersion of the copolymerizate (B), are physically mixed. A copolymer dispersion (aforementioned combination (E)) containing (1) one or both of the poly-adduct (C) and the copolymerizate (B) and (2) a polymer of "other monomer(s)" is advantageously prepared by first preparing a dispersion of the poly-adduct (C) and/or the copolymerizate (C) in the aforementioned polyahl (A) by one of the foregoing methods and then adding the "other monomer(s)" to the dispersion and subjecting the resulting formulation to polymerization conditions. The poly-adduct (C) and/or the copolymerizate (B) stabilize the resulting dispersion containing combination (E) in much the same manner as the polymeric stabilizer described in U.S. Pat. No. 4,148,840 stabilizes the copolymer dispersions described therein.

Any of the aforementioned copolymer dispersions is readily reacted with an organic polyisocyanate to form desired polyurethane products using conventional polyurethane reaction conditions and procedures. Such reaction and procedures are optionally carried out in the presence of additional polyahls, chain extending agents, catalysts, surface active agents, stabilizers, blowing agents, fillers and/or pigments. In the preparation of foamed polyurethane, suitable procedures for the preparation of same are disclosed in U.S. Pat. No. Re. 24,514, which is incorporated herein by reference. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the graft copolymer dispersion of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride and methylene chloride may be used as blowing agents.

The foams may also be prepared by the froth technique as described in U.S. Pat. Nos. 3,755,212; 3,849,156 and 3,821,130 which are also incorporated herein by reference.

Organic polyisocyanates which may be employed include aromatic, aliphatic and cycloaliphatic polyisocyanates and combination thereof. Representative of these types are the diisocyanates such as m-phenylene diisocyanate, tolylene-2,4-diisocyanate, tolylene-2,6-diisocyanate hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4''-triphenylmethane triisocyanate, polymethylene polyphenylisocyanate and tolylene-2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the practice of the present invention, such as crude toluene diisocyanate obtained by the phosgenation of a mixture of toluene diamines or crude diphenylmethylene diisocyanate obtained by the phosgenation of crude diphenylmethylenediamine. The preferred undistilled or crude isocyanates are disclosed in U.S. Pat. No. 3,215,652.

The copolymer dispersions of this invention are preferably employed in combination with other polyahl(s) commonly employed in the art. Accordingly, any of the polyahls which are described above for use in the preparation of the polymer dispersions of the present invention may be employed.

Chain-extending agents which may be be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols or mixtures thereof. A preferred group of chain-extending agents includes water and primary and secondary aromatic diamines which react more readily with the isocyanate than does water such as phenylenediamine, bis(3-chloro-4-aminophenyl)methane, 2,4-diamino-3,5-diethyl toluene, trisecondary butanolamine, isopropanolamine, diisopropanolamine, N-(2-hydroxypropyl)ethylenediamine, and N,N'-di(2-hydroxypropyl)ethylenediamine.

The urethane reaction of polyisocyanate with the copolymer dispersion is advantageously carried out in the presence of an amount of an urethane-type catalyst which is effective to catalyze the reaction of the polyahl of the copolymer dispersion with the polyisocyanate. Preferably, the amount of urethane catalyst in an amount comparable to that used in conventional urethane-type reactions.

Any suitable urethane catalyst may be used including tertiary amines, such as, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-dimethyl-N',N'-methyl isopropyl propylenediamine, N,N-diethyl-3-diethylaminopropylamine, dimethyl benzylamine and the like. Other suitable catalysts are, for example, tin compounds such as stannous chloride, tin salts of carboxylic acids such as dibutyltin di-2-ethyl hexoate, as well as other organometallic compounds such as are disclosed in U.S. Pat. No. 2,846,408.

A wetting agent(s) or surface-active agent(s) is generally necessary for production of high grade polyurethane foam according to the present invention, since in the absence of same, the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters and alkyl arylsulfonic acids.

The following examples are given to illustrate the present invention and are not to be construed as limiting the scope thereof in any manner. All parts and percentages are by weight unless otherwise indicated.

EXAMPLE 1

Into a 2-liter, 3-neck round-bottom flask equipped with addition funnel, stirrer, condenser, and thermocouple is charged 1430 g (0.5 equivalent) of a butanol-initiated polyalkylene glycol (0.59 percent hydroxyl) (Monoahl I) made from propylene oxide, 0.02 g of dibutyltin dilaurate (DBTDL) and 1.43 g of 2,6-di-(t-butyl)-4-methyl phenol (IONOL). The resulting mixture is heated to 70° C. and 54 g (0.35 equivalent) of 2-isocyanatoethyl methacrylate (IEM) is added over a 25-minute period to the mixture with stirring. After an additional 70 minutes, an additional 0.18 g of DBTDL is added to the mixture and the reaction is completed within 30 minutes to form the mono-adduct (Mono-Adduct I). At this time, a 100-g portion of Mono-Adduct I and 1000 g (0.2 mol) of a glycerine-initiated polyalkylene glycol made from propylene oxide (hydroxyl no. of 34) (Polyglycol I) are combined in the aforementioned reacton vessel wherein the addition funnel is modified to add its contents at the liquid surface in the vessel. The mixture is Polyglycol I and the mono-adduct is purged with $N_2$ and heated to 120° C. A mixture of 350 g of styrene, 100 g of Polyglycol I and 7 g of azobis(isobutyronitrile) (AZO) is added to the reaction vessel over a 105-minute period. Then a mixture of 1 g of AZO and 100 g of Polyglycol I is added over a period of one hour and the reaction mixture is digested for 30 minutes. The reaction product is subjected to vacuum for an hour to remove volatiles. The final product is a stable copolymer dispersion having a Brookfield viscosity (Model RV, spindle #3 at rpm of 10 and a temperature of 25° C.) of 2530 cps.

For purposes of comparison, the foregoing procedure is followed except that no IEM is added at any point during the process. Upon subjecting the reaction mixture containing no IEM to polymerization conditions, a very poor dispersion is formed containing relatively large chunks (>1 mm) of polystyrene. During the later stages of the reaction, the reaction mixture becomes so viscous that the stirrer can no longer operate. The resulting reaction mass exhibits poor fluidity and cannot be classified as a stable dispersion.

EXAMPLE 2

The stable copolymer dispersion of Example 1 is converted to a urethane thermoset elastomer by mixing 110 g of the dispersion with (1) 6.9 g of a reaction product of 10 parts of toluene diisocyanate and 2.5 parts of glycerine-initiated polypropylene oxide ($M_n$—260, hydroxy equivalent weight (HEW) of 86.7 (Polyglycol II)) and (2) 0.1 g of stannous octoate. The resulting mixture is poured into a beaker and heated at 80° C. for 15 minutes to form the elastomer.

EXAMPLE 3

A 980-g (0.2 mol) portion of Polyglycol I and 20 g of Mono-Adduct I are charged with stirring into a 2-liter, 3-neck round-bottom reaction vessel equipped as described in Example 1. The resulting mixture is heated to 120° C. and a mixture of 65 g of styrene, 260 g of acrylonitrile, 6.5 g of AZO and 200 g of Polyglycol I is added to the reaction vessel over a 2-hour period. After digesting the reaction mixture for an additional hour at 120° C., volatiles are removed from the product under vacuum for one hour. The resulting stable milky copolymer dispersion has a Brookfield viscosity (Model RV, spindle #3, rpm 20 at 25° C.) of 2660 cps.

Following the foregoing procedure except that the weight ratio of styrene (S) to acrylonitrile (VCN) is varied from 30:70 to 70:30, several additional copolymer dispersions are prepared which dispersions having Brookfield viscosities of 2395 cps (30 S:70 VCN) to 4980 cps (70 S:30 VCN). At S:VCN weight ratio of 10:90, the dispersion has an infinite viscosity.

EXAMPLE 4

A 200-g portion of Polyglycol I is charged with stirring into a 2-liter, 3-neck, round-bottom reaction vessel equipped as described in Example 1. The polyol is heated to 115° C. and a mixture of 430 g of acrylonitrile, 6.2 g of AZO, 780 g of Polyglycol I, and 16 g of Mono-Adduct I is added to the reaction vessel over an 80-minute period. After digesting the reaction mixture for an additional 70 minutes at 115° C., volatiles are removed from the product under vacuum for one hour.

The resulting stable milky dispersion has a Brookfield viscosity (Model RVT, spindle #6 at 20 rpm and 25° C.) of 15,000 cps. In order to obtain a copolymer dispersion of reduced viscosity, the foregoing dispersion can be diluted with Polyglycol I.

EXAMPLE 5

Following the procedure of Example 3 except that a S:VCN weight ratio of 50:50 and polyglycols of different molecular weights are employed, these copolymer dispersions are prepared and tested for Brookfield viscosity. The results are reported in Table I.

TABLE I

| Sample No. | Polyglycol (1) $M_n$ | OH # | Viscosity (2), cps |
|---|---|---|---|
| 1 | 7000 | 24.4 | 4325 |
| 2 | 3800 | 29.7 | 3195 |
| 3 | 3000 | 57.8 | 2000 |

(1) $M_n$ = number average molecular weight determined by hydroxyl number; OH # = hydroxyl number.
(2) Brookfield viscosity (Model RVT, spindle #3 at 20 rpm and 25° C.).

EXAMPLE 6

A 1000-g (2.5 mol) portion of a difunctional poly(propylene glycol) ($M_n$—400, HEW—200) (Polyglycol III) and 100 g of Mono-Adduct I are charged with stirring into a reaction vessel as described in Example 3. The resulting mixture is heated to 120° C. and a mixture of 175 g of styrene, 175 g of acrylonitrile, 7 g of AZO and 200 g of Polyglycol III is added to the reaction vessel over a 2-hour period. After digesting the reaction mixture for 1 hour at 120° C., volatiles are removed from the product under vacuum for 1 hour. The resulting stable copolymer dispersion has a Brookfield viscosity (Model RV, spindle #3, at 50 rpm and 25° C.) of 352 cps.

When the foregoing procedure of this example is repeated using dipropylene glycol as the polyglycol, the reaction product undergoes phase separation and coagulation upon cooling.

EXAMPLE 7

Following Example 5 except that the amount of Mono-Adduct I is varied and the polyglycol is a glycerin-initiated polypropylene glycol having a hydroxy equivalent weight (HEW) of 233 and an $M_n$ of 700 (Polyglycol IV), three copolymer dispersions (Sample Nos. 1–3) are prepared and tested for viscosity. The results are reported in Table II.

COMPARATIVE RUNS (Not examples of invention)

A 1000-g portion of Polyglycol IV is charged into a 2-liter, 3-neck, round-bottom reaction vessel equipped as described in Example 1. The Polyglycol IV is heated to 115° C. while mixing and a solution of 175 g styrene, 175 g of acrylonitrile, 7 g of AZO and 200 g of Polyglycol IV is added to the reaction vessel over a 2-hour period. However, after adding approximately one-half of the monomer solution, massive phase separation and flocculation occurs making it impossible to continue the experiment (Sample No. A in Table II).

A 1088-g portion of Polyglycol IV, 12 g of a 1 percent solution of dibutyltin dilaurate in Polyglycol IV, and 0.582 g of isocyanatoethyl methacrylate is charged into a 2-liter, 3-neck, round-bottom reaction vessel equipped as described in Example 1. The polyol mixture is heated to 120° C. for one hour to allow for the reaction of the isocyanate with the glycol while mixing. Then a solution of 150 g of styrene, 150 g of acrylonitrile and 6 g of AZO is added to the reaction vessel over a 2-hour period. After this addition, massive phase separation and flocculation occurs making this an unstable product (Sample No. B).

TABLE II

| Sample No. | Amount of Mono-Adduct I, g | Viscosity (1), cps |
|---|---|---|
| 1 | 100 | Paste |
| 2 | 50 | 24,600 (Spindle #5, 10 rpm) |
| 3 | 25 | 5,200 (Spindle #4, 20 rpm) |
| A* | None | Complete phase separation |
| B* | None | Complete phase separation |

*Not an example of the invention.
(1) Brookfield viscosity (25° C.). The dispersions of Sample Nos. 2 and 3 are thixotropic, i.e., the dispersions are initially gel like at low shear but reasonably fluid after high shear has been applied. The paste of Sample No. 1 is a stable dispersion which is too thick for accurate measurement of viscosity using a Model RV Brookfield viscometer.

As evidenced by the data shown in Table II, stable copolymer dispersions can be prepared by using the mono-adducts of this invention and a low molecular weight polyol as the continuous phase. However, as shown in Sample Nos. A and B, such stable dispersions are not obtained when the monoahl is not employed.

EXAMPLE 8

Following the procedure of Example 1, a mono-adduct (Mono-Adduct II) is prepared using 1000 g (0.47 equivalent) of a methanol-initiated poly(propylene glycol) having a $M_n$ of 2110 (Monoahl II), 0.2 g of DBTDL, 1 g of IONOL and 70 g (0.45 equivalent) of IEM which is added with stirring to the reaction vessel containing Polyglycol I, DBTDL and IONOL over a period of one hour. After an additional 2.5 hours, the resulting Mono-Adduct II (which is essentially free of NCO) is recover as a clear liquid.

Following the procedure of Example 7 except that the foregoing Mono-Adduct II is substituted for Mono-Adduct I and is used at concentrations of 25 g and 100 g, two copolymer dispersions are prepared and tested for viscosity. The results are reported in Table III.

TABLE III

| Sample No. | Amount of Mono-Adduct II, g | Viscosity (1), cps |
|---|---|---|
| 1 | 25 | 16,680 (5 rpm) |
| 2 | 100 | 1,250 (20 rpm) |

(1) Brookfield viscosity (RV viscometer, #3 spindle, 25° C.).

EXAMPLE 9

A 27.6-g portion of the copolymer dispersion of Example 6 and 22.7 g of the reaction product of 100 g of toluene diisocyanate and 25 g of Polyglycol II in 75 g of dioctylphthalate are mixed in a 100 ml poly beaker. To the resulting mixture is added 0.1 g of stannous octoate with stirring. The mixture exotherms within seconds and gels within 1.5 minutes. The gel is heated at 85° C. for 10 minutes to form a solid rubber-like composition.

Similar results are obtained when the other copolymer dispersions described hereinbefore are employed in the aforementioned polyurethane process.

EXAMPLE 10

Following the procedure of Example 1, a mono-adduct (Mono-Adduct III) is prepared using 650 g (1 equivalent) of a methanol-initiated poly(propylene glycol) ($M_n$ of 650) (Monoahl IV), 0.2 g of DBTDL, 0.8 g of IONOL, and 147 g (0.95 equivalent) of IEM which is added with stirring to the reaction vessel containing the polyglycol, DBTDL and IONOL over a period of 30 minutes. After an additional 5.75 hours, the resulting Mono-Adduct III (which is essentially free of NCO) is recovered as a clear liquid.

In the same manner, a mono-adduct (Mono-Adduct IV) is prepared using 412.6 g (2 equivalents), a methanol-initiated poly(propylene glycol) ($M_n$ of 206.3) (Monoahl IV); 0.2 g of DBTDL; 0.4 g of IONOL; and 294.8 g (1.9 equivalents).

Following the procedure of Example 9, except that the foregoing Mono-Adducts III and IV are substituted for Mono-Adduct I at a concentration of 100 g, two additional copolymer dispersions are prepared and tested for viscosity. The results are reported in Table IV.

TABLE IV

| Sample No. | Mono-Adduct | Mol. Wt. Monoahl g/mol | Viscosity cps |
|---|---|---|---|
| 1 | IV | 206 | 14,600 |
| 2 | III | 650 | Stable, but very viscous dispersion |
| 3 | II | 2100 | 1,250 |
| C* | None | — | Phase separation |

*Not an example of the invention.

EXAMPLE 11

Using the copolymer dispersions of Examples 1, 2 and 3, several polyurethane foams are prepared according to the following procedure. A formulation of 63.3 parts of Polyglycol I, 36.7 parts of the copolymer dispersion, 3.3 parts of water, 0.7 part of a silicone surfactant sold by Union Carbide under the trade name L5303, 0.04 part of a second silicone surfactant sold by Dow Corning under the trade name DCF-1-1630, 0.185 part of triethylenediamine, 0.1 part of bisdimethylaminoethyl ether, 0.005 part of Fomrez UL-1 sold by Witco Chemical are blended with 39.4 parts of an 80/20 mixture of toluene diisocyanate and polymeric methylene diphenyl isocyanate sold by Mobay Chemical Company under the trade name Mondur MR. The mixture is poured into a paper paint bucket and allowed to stand for 5 minutes at room temperature. Then the foam is cured for 10 additional minutes in a 120° C. oven. After crushing the foam, it is cured for an additional 15 minutes at 120° C. In each of the foam samples, satisfactory polyurethane foam is obtained.

What is claimed is:

1. An ethylenic addition polymerizable adduct of a monoahl and an active ethylenically unsaturated isocyanate monomer, said monoahl being an organic compound containing only one active hydrogen moiety capable of reacting with the isocyanate moiety of the isocyanate monomer to form the adduct, said adduct being represented by the formula:

$$Y-(R'''A)_m R'''-Z$$

wherein each A is individually —O—, —S— or

wherein $R_1$ is hydrogen or alkyl; Y is oxyalkyl or oxyaryl; Z is an oxycarbonylaminoalkyl ester of an α,β-ethylenically unsaturated carboxylic acid; each R''' is individually alkylene, arylene hydroxyalkylene, aminoalkylene, alkoxyalkylene, aryloxyalkylene, arylalkylene, hydroxyarylalkylene or haloalkylene; and m is a whole number such that $-(R'''A)_m R'''-$ has a number average molecular weight from about 60 to about 100,000 and being capable of stabilizing a dispersion of a polymer comprising the adduct in a continuous liquid phase.

2. The adduct of claim 1 wherein the continuous liquid phase is a polyahl.

3. The adduct of claim 1 wherein the isocyanate monomer is an isocyanate alkyl ester of an α,β-ethylenically unsaturated carboxylic acid and the monoahl is a polyalkylene ether monol.

4. The adduct of claim 3 wherein the isocyanate monomer is 2-isocyanatoethyl methacrylate and the monoahl is monohydric alcohol-initiated polyalkylene glycol having an $M_n$ of at least 200, wherein alkylene is ethylene, propylene or a mixture thereof and the polyalkylene ether monol has been prepared using a monohydric initiator selected from methanol, ethanol, butanol, tripropylene glycol methyl ether and phenol.

5. A stable copolymer dispersion comprising
   (a) a polyahl having dispersed therein; and
   (b) an ethylenic addition copolymerizate of (1) the adduct of claim 1 and (2) at least one ethylenically unsaturated monomer other than the isocyanate monomer ("other monomer"); or
   (c) a mixture of (1) an adduct of (i) a monoahl and (ii) an addition copolymer of the isocyanate monomer with at least one "other monomer" which is non-reactive with the isocyanate monomer and the monoahl and (2) an ethylenic addition polymer of at least one "other monomer"; or
   (d) a combination of (b) and (c); or
   (e) a combination of (b) and/or (c) and an ethylenic addition polymer of at least one "other monomer," said monoahl and isocyanate monomer being present in reacted form in an amount sufficient to stabilize the dispersion.

6. The dispersion of claim 5 wherein the polyahl is a polyol, the monoahl is a polyalkylene ether monol, and the isocyanate monomer is an isocyanatoalkyl ester of an α,β-ethylenically unsaturated carboxylic acid.

7. The dispersion of claim 6 wherein the "other monomer" is styrene, acrylonitrile, or a mixture thereof.

8. The dispersion of claim 7 wherein the polyahl is a polyalkylene glycol, the monoahl is a monohydric alcohol-initiated polyalkylene glycol having an $M_n$ of at least 200, wherein alkylene is ethylene, propylene or a mixture thereof, the monohydric alcohol is methanol, ethanol and butanol and the isocyanate monomer is 2-isocyanatoethyl methacrylate.

9. The dispersion of claim 8 which comprises from about 60 to about 90 weight percent of (A) the polyahl, and (B) the copolymerizate comprising from about 0.02 to 5 weight percent of the adduct and from about 10 to about 30 weight percent of other monomers, all of said weight percentages being based on the weight of the dispersion.

* * * * *